United States Patent
Shimogama

[11] Patent Number: 6,107,601
[45] Date of Patent: Aug. 22, 2000

[54] APPARATUS AND METHOD FOR CONTROLLING AN ARC WELDING ROBOT

[75] Inventor: Shigeru Shimogama, Kawanishi, Japan

[73] Assignee: Matsushita Electric Industrial Co., Ltd., Osaka, Japan

[21] Appl. No.: 09/163,349

[22] Filed: Sep. 30, 1998

[30] Foreign Application Priority Data

Oct. 1, 1997 [JP] Japan .................................. 9-268484
Oct. 1, 1997 [JP] Japan .................................. 9-268485

[51] Int. Cl.$^7$ ...................................................... B23K 9/10
[52] U.S. Cl. ................................. 219/130.01; 219/130.5; 219/137.71; 901/42
[58] Field of Search ........................... 219/130.5, 124.03, 219/124.34, 125.1, 130.01, 130.31, 130.32, 130.33, 130.4, 137.7, 137.71; 901/42; 702/184

[56] References Cited

U.S. PATENT DOCUMENTS

| | | |
|---|---|---|
| 3,581,050 | 5/1971 | Brown et al. ........................... 219/137.7 |
| 4,578,562 | 3/1986 | Lindstrom et al. ................... 219/130.5 |
| 4,650,957 | 3/1987 | Cullen et al. ....................... 219/124.03 |
| 5,278,390 | 1/1994 | Blankenship ......................... 219/130.5 |
| 5,353,238 | 10/1994 | Neef et al. .............................. 702/184 |
| 5,770,834 | 6/1998 | Davis et al. ........................... 219/130.5 |

FOREIGN PATENT DOCUMENTS 4-237565 8/1992 Japan .
8-39241 2/1996 Japan .

*Primary Examiner*—Clifford C. Shaw
*Attorney, Agent, or Firm*—Wenderoth, Lind & Ponack, L.L.P.

[57] ABSTRACT

An apparatus and method controls an arc welding robot. During robot teaching, an allowable width for a command value (central value) is entered via an input. The robot is taught, and operated according to data stored in a memory, and a CPU judges if an actual welding value taken from an external interface during actual welding is within the allowable width corresponding to the entered welding condition command value, and when the actual welding value is outside of the allowable width, operation information of the robot can be immediately displayed by an information noticing device, or stored in the memory, and displayed in batch at the end of one welding stroke. An arc welding condition is monitored only during regular welding, and can be ignored during crater treatment, or a section of unstable welding right after the start of welding can be excluded from the welding condition monitoring object section. As required, depending on characteristics of a wire feeder, the conditions of crater treatment can be changed.

12 Claims, 13 Drawing Sheets

```
CONTROL DATA: WELDING QUALITY
------------------------------12/25---------
                          UPPER   LOWER
JOB. 11                   LIMIT   LIMIT
PRG. 123  WELDING         +20A    -20A
          CURRENT
STEP. 45  OFF-RANGE         1       2
          TIMES
          WELDING VOLTAGE +3.0V   -2.5V
          OFF-RANGE TIMES   0       1

PAGE FORWARD    PAGE BACKWARD
```

FIG. 12

| FALL OF WIRE FEED MOTOR CHARACTERISTIC | | |
|---|---|---|
| WELDING POWER SOURCE COMMAND VALUE | ROTATING SPEED | ACTUAL ROTATING SPEED FALL TIME |
| 25A | 8.1 | 169.0 |
| 50A | 9.5 | 181.8 |
| 75A | 10.9 | 179.6 |
| 100A | 16.1 | 183.0 |
| 125A | 19.9 | 232.4 |
| 150A | 27.2 | 203.6 |
| 175A | 34.4 | 227.4 |
| 200A | 44.7 | 242.4 |
| 225A | 53.5 | 233.8 |
| 250A | 65.8 | 270.8 |
| 275A | 80.3 | 318.0 |
| 300A | 99.0 | 354.6 |
| 325A | 113.8 | 400.0 |
| 350A | 131.2 | 402.5 |
| 375A | | |
| | RPM | MSEC |

FIG. 14

PANASONIC ARC MONITOR
UL-230A LL-210A X4

| IUL CURRENT A | 2 VOLTAGE V | 3 SHORT-CIRCUIT COUNT /S | 4 EXTERNAL 1 V | 5 EXTERNAL 2 V |
|---|---|---|---|---|
| 222 | 21.8 | 115 | 10.7 | 10.2 |
| 218 | 21.9 | 117 | 10.7 | 10.0 |
| 216 | 22.3 | 119 | 10.3 | 9.9 |
| 215 | 22.5 | 123 | 10.1 | 9.5 |
| 213 | 22.6 | 116 | 10.2 | 9.2 |
| 211 | 22.8 | 112 | 9.9 | 8.8 |
| 208 < | 23.0 | 122 | 9.8 | 8.6 |
| 220 | 21.9 | 126 | 10.8 | 6.4 |
| 224 | 21.8 | 114 | 11.2 | 6.1 |
| 233 > | 22.0 | 102 | 11.6 | 5.0 |

WELDING TIME = 0MIN. 42SEC.

UL-230A LL-210A X4

12
APPARATUS AND METHOD FOR CONTROLLING AN ARC WELDING ROBOT

FIELD OF THE INVENTION

The present invention relates to a welding operation of an arc welding robot combining an industrial robot of a teaching playback system and a welding power source, and more particularly to a control apparatus of an arc welding robot for facilitating maintenance and control of welding quality by monitoring whether or not actual welding conditions values are within appropriate range corresponding to welding condition command values, or treating a crater properly at the end of welding for preventing wire sticking.

BACKGROUND OF THE INVENTION

An example of a welding monitoring apparatus for monitoring whether or not the actual welding condition values are within the appropriate range corresponding welding condition command values in the prior art is disclosed in Japanese Laid-Open Patent No. 4-237565. That is, as shown in FIG. 13, the apparatus comprises a CPU circuit 100 and an external interface circuit 101. A printer 103 is connected to the CPU unit through a printing output interface 102. A measurement and display changeover circuit 104 is used as a measurement and display changeover means, and a limiter upper and lower limit selection adjusting circuit 105, a limiter upper and lower limit adjuster 106, and a limiter selector 107 are combined to comprise a limiter upper and lower limit setting means. Actual welding conditions are obtained through a welding current detector 108 and a welding voltage detector 109, and are displayed in a display unit 110.

In this configuration, limiter levels of the upper and lower limits can be directly set by the limiter upper and lower limit setting means, and an output result, as shown in FIG. 14, is printed out so that the welding current and the welding voltage are monitored to determine whether or not they are within an appropriate range. In FIG. 14, in the second line, UL=230 A (amperes) and LL=210 A indicate the upper and lower limits of the present welding current monitoring range. The asterisked "1UL" in FIG. 14 indicates the monitoring of the welding current, showing that it is lower than the lower limit level at 208 <indicated by "a" mark and higher than the upper limit level at 233> indicated by "b" mark.

However, in such a welding monitoring apparatus, since the upper and lower limits (allowable) of the welding current and welding voltage, as the objects of welding quality control are specified by actual numeric values, if the welding condition command is changed during operation, the upper and lower limits of the welding current and welding voltage as the objects of welding quality control cannot be used unless they are set again in actual numeric values, accordingly. Moreover, since an unstable arc section right after an initial arc start in one welding section is also monitored, a detection error may occur although the weld is not defective.

Moreover, crater treatment is executed at the end of one welding section, but during this crater treatment operation, since the welding condition command is lowered by about 50 A in welding current and 5V in welding voltage from the actual welding conditions, a detection error occurred in this crater treatment section in the prior art.

In an automatic welding line by a robot, etc., when used in the conventional arc welding condition monitoring apparatus, operation information or other information of the robot at a moment of welding failure could not be obtained, and it took time to plan a countermeasure or to understand the welding failure tendency, and as a result, prompt measures could not be put into effect.

In the light of the problems of the prior art, it is hence an object of the invention to present a control apparatus of an arc welding robot, using a teaching playback robot, capable of monitoring whether the arc welding conditions are within an appropriate range or not, presenting to a user the information showing at which teaching point during robot operation is the point of occurrence if an arc welding condition goes out of the appropriate range, and maintaining and controlling the arc welding quality sufficiently, inexpensively, easily and promptly.

Concerning the prior art technology for treating the crater properly at the end of welding, if the arc is cut off immediately at the end of welding, generally, the deposit metal is thin in this area, the crater is formed on a bead appearance and the appearance is impaired and as a result, the welding strength is decreased. Accordingly, the welding operator builds up the weld metal at the end of welding, which is called crater treatment. With the welding robot, crater treatment is done by a user's teaching, and the art for saving this teaching step is disclosed in Japanese Laid-Open Patent No. 8-39241. In short, the current, the voltage and a crater filler time for crater treatment are preliminarily stored, and crater treatment is executed at the arc cut-off point according to the second current, voltage and crater filler time, and then the arc cut-off command is executed.

Usually, the welding power source commands and controls a wire feed device 16 for feeding consumable electrodes (hereinafter called wires) so that a wire feed speed may be proportional to the welding current command value. However, there is a response delay of hundreds of milliseconds from the issue of a command for a new wire feed speed from the welding power source to the wire feeder reaches the commanded new wire feed speed.

Accordingly, if the response delay time necessary for changing the wire feed speed remains unknown, it is not known whether the crater welding condition command is executed at the time of actual crater welding treatment, and a lot oftime is spent determining the welding condition. Herein, at the end point of welding, if the time difference of the robot control apparatus sending a crater welding condition command and an arc cut-off command to the welding power source are far smaller values than the delay time corresponding to the response delay of the wire feeder mentioned above, wherein the wire feed speed is the same as in the regular welding condition command value, and the welding condition command value is a far smaller crater welding condition command value than the regular welding condition command value, and when welding in such a condition, the wire is fused and sticks to the work at the end of welding, and so-called wire stick (fusion of wire on object of welding) occurs. If wire stick occurs, the operator must cut of the stuck wire with snippers or the like, and polish the bead surface, and this post-treatment hinders unmanned operation by robot and impairs the cycle time.

To avoid this wire stick in crater treatment, the wire feed amount should be less than the wire melting allowable value, and when the welding condition command value is changed, it is known that wire stick does not occur if enough response delay time of the wire feeder is provided by the portion corresponding to the changing amount.

The invention is devised in the light of the above problems of the prior art, and it is hence and object thereof to execute crater treatment appropriately in the control apparatus of the arc welding robot, to judge whether or not necessary time is maintained until the wire reaches the command feed speed after transmission of the crater welding condition command (welding current, welding voltage, welding end command (arc cut-off, welding shield gas cut-off, etc.)) to the welding power source, to execute the welding condition command value when maintained, or to execute the crater treatment without changing the wire feed speed, if not maintained, at the same regular welding condition command value by ignoring the crater welding condition command value, thereby preventing wire stick and enhancing cycle time and promoting automation of the automatic welding line using a robot.

SUMMARY OF THE INVENTION

To achieve the above-mentioned objects, the control apparatus of the arc welding robot of the invention for monitoring whether or not the actual welding condition values are within an appropriate range corresponding to the welding condition command value is as a first embodiment, a control apparatus of an arc welding robot for sending a welding condition command or welding start command to the welding power source when an effect point, that is, the arc point (control point) of a welding torch held by a held by a robot arm reaches a welding start point, and sending a crater welding condition command or welding end command to the welding power source when the effect point of the welding torch held by the robot arm reaches a welding end point. The control apparatus comprising an external interface for obtaining an actual welding condition of an actual welding current and an actual welding voltage, an input for entering an allowable width of either a welding condition command value of the welding current or welding voltage, a memory for storing the entered allowable range values, a CPU for judging if the actual welding value taken in during actual welding from the external interface is within the allowable range of the welding condition command value, and an information noticing device for displaying operation information of the robot to the user at the moment when the actual welding value goes out of the allowable range values of the welding condition command value, thereby realizing the arc welding condition monitoring function.

In a second aspect of the invention, employing the arrangement of the first aspect, the arc welding condition is monitored only during regular welding, and is ignored during crater treatment.

A third aspect of the invention, employing the arrangement of the first aspect, further including an information noticing device for displaying the operation information when the actual welding value goes out of the condition range during the monitoring of the arc welding condition, the operation information comprising at least one of the welding condition upper and lower limit values, the number of times it goes out of the range, a job number, a program number and a step number of the robot at the time of an occurrence of such a status at the end of crater welding as the end if one welding stroke.

In a fourth aspect of the invention, employing the arrangement of the first aspect, the operation information of the robot at the point of going out of the allowable range values in the arc welding condition monitoring function is compiled in time series and stored in a nonvolatile memory so as to hold the data even after the main power source is turned off, and the operator can obtain the operation information of the robot, whenever necessary, through the information noticing device.

A fifth aspect of the invention, employing the arrangement of the first aspect, further includes the robot control apparatus main body being capable of setting a monitoring start delay time T1 right after a start of welding in order to eliminate a section of unstable welding state from a welding condition monitoring object section, thereby delaying the start of the monitoring of the welding condition for the set time.

Incidentally, a central control unit is a communication control unit for exchanging control signals with the welding power source, and it is controlled through a bus from the CPU of the welding power source side. This external interface circuit is designed to obtain the actual welding current and actual welding voltage in order to control the welding, and these actual values are communicated to the robot control apparatus main body. As a result, the robot control apparatus incorporates the actual welding condition values directly from the welding power source, so that it is not necessary to add a special device for detecting the welding current and voltage.

Thus, according to the first aspect of the invention, since the welding condition monitoring range is specified by the width of the allowable range corresponding to the welding condition command values, not by the actual numerical values of the fixed upper limit and lower limit, the arrangement is free from the effects of changes of the teaching data of the welding condition command values.

According to the second aspect of the invention, it is only during the regular welding that the arc welding condition is monitored, and during crater treatment it is ignored, and hence detection error does not occur during crater treatment. In the third aspect of the invention, if the actual arc welding value goes out of the arc welding condition monitoring range, in any step of the welding, the out-of-range information, such as the robot job number, program number, step number, number of times going in and out of range in the section, and condition monitoring range values are transmitted to the external information noticing device, such as a teaching pendant or a personal computer, and therefore the operation information system can be obtained promptly, and the welding failure trend will be known and swift measures can be put into effect.

According to the fourth aspect of the invention, the out-of-range information is stored in the memory in time series, and the operator can obtain, whenever necessary, the out-of-range information data in time series through the teaching pendant or external personal computer, so that the tendency of a failure phenomenon of the arc welding condition can be easily understood.

According to the fifth aspect of the invention, since the unstable arc region upon arc start can be excluded from the arc welding condition monitoring object, detection error of arc welding condition monitoring can be prevented, and the welding quality can be maintained and controlled easily and sufficiently.

To achieve the object, sixth aspect of a control apparatus of the arc welding robot of the invention for preventing wire stick by performing a crater treatment operation favorably at the end of welding and for commanding the welding conditions and the welding start of the welding power source when the effect point of a welding torch held by a robot arm reaches the welding start point. The control apparatus further commanding the crater welding conditions and the welding end of the welding power source when the effect point of the welding torch held by the robot arm reaches the welding end point, comprising: determining a time T2 until the arc is cut off after sending the crater welding condition command to the welding power source in the crater treatment procedure when the effect point of the welding torch held by the robot arm reaches the welding point, and determining a response delay time t of a wire feeder when the welding condition command value is changed over from the regular welding condition command value to the crater welding condition command value; judging the duration of the times T2 and t; sending the crater welding condition command to the welding power source when T2≧; waiting for the time T2 while temporarily stopping in an arc-on state sending the crater welding condition command to the welding power source when T2<t; waiting for the time t while temporarily stopping in the arc-on state; and commanding an arc cut-off to he welding power source at the end of the crater treatment procedure of either waiting for the time T2 or the time t, whereby the first crater treatment procedure is executed, and a beautiful welding bead appearance is obtained while preventing wire stick.

A seventh aspect of the invention relates to a control apparatus of an arc welding robot for commanding the welding conditions and welding start of the welding power source when the effect point of the welding torch held by the robot arm reaches the welding start point, and for commanding the crater welding conditions and welding end of the welding power source when the effect point of the welding torch held by the robot arm reaches the welding end point, comprising: determining the time T2 until the arc is cut off after sending the crater welding condition command to the welding power source in the crater treatment procedure when the effect point of the welding torch held by the robot arm reaches the welding end point, and the response delay time t of the wire feeder when the welding condition command value is changed over from the regular welding condition command value to the crater welding condition command value; judging the duration of the times T2 and t; sending the crater welding condition command to the welding power source when T2≦t; waiting for the time T2 while temporarily stopping in the arc-on state, with the welding condition command maintained at the regular welding condition command value, when T2<t; and commanding the arc cut-off to the welding power source, whereby the second crater treatment procedure is executed, and the welding process is terminated in a shortest time while preventing wire stick.

An eighth aspect of the invention relates to a control apparatus of an arc welding robot for commanding the welding conditions and welding start to the welding power source when the effect point of the welding torch held by the robot arm reaches the welding start point, and commanding the crater welding conditions and welding end to the welding power source when the effect point of the welding torch held by the robot arm reaches the welding end point. The control apparatus comprising: a CPU for executing the first or second crater treatment procedure and for storing as a microcomputer, a control program so as to change the characteristic, when the wire feed characteristic is changed due to a model change of the wire feeder or the like; a nonvolatile memory for holding characteristic data; and a personal computer used as a man-machine interface.

A ninth aspect of the invention, in addition to the sixth or seventh aspect, further comprising an interface for a teaching pendant for connecting the teaching pendant which is a man-machine interface for selecting either the first or second crater treatment procedure.

According to the above-mentioned arrangement, in the control apparatus of the arc welding robot in the sixth aspect of the invention, aside from the prevention of wire stick in the crater treatment, where the welding bead appearance is more important, the welding end is processed by the crater welding condition command value in the first crater treatment procedure. In the seventh aspect of the invention, where the cycle time is more important, the welding end is processed by the set time T2 in the second crater treatment procedure. In the eighth aspect of the invention, if the wire feed characteristic (response delay time of wire feed) is changed due to a model change of the wire feeder or the like, the characteristic change can be done easily with the personal computer. In the ninth aspect of the invention, either the first or second crater treatment procedure can be selected by the teaching pendant which is a man-machine interface.

BRIEF DESCRIPTION OF THE DRAWINGS

FIG. 12 is an input screen of data of time and rotating speed relating to a wire feeder on a personal computer screen.

FIG. 14 is an output data diagram of monitoring result of a welding condition in the prior art.

DETAILED DESCRIPTION OF THE INVENTION (First Embodiment)

Figure 1:
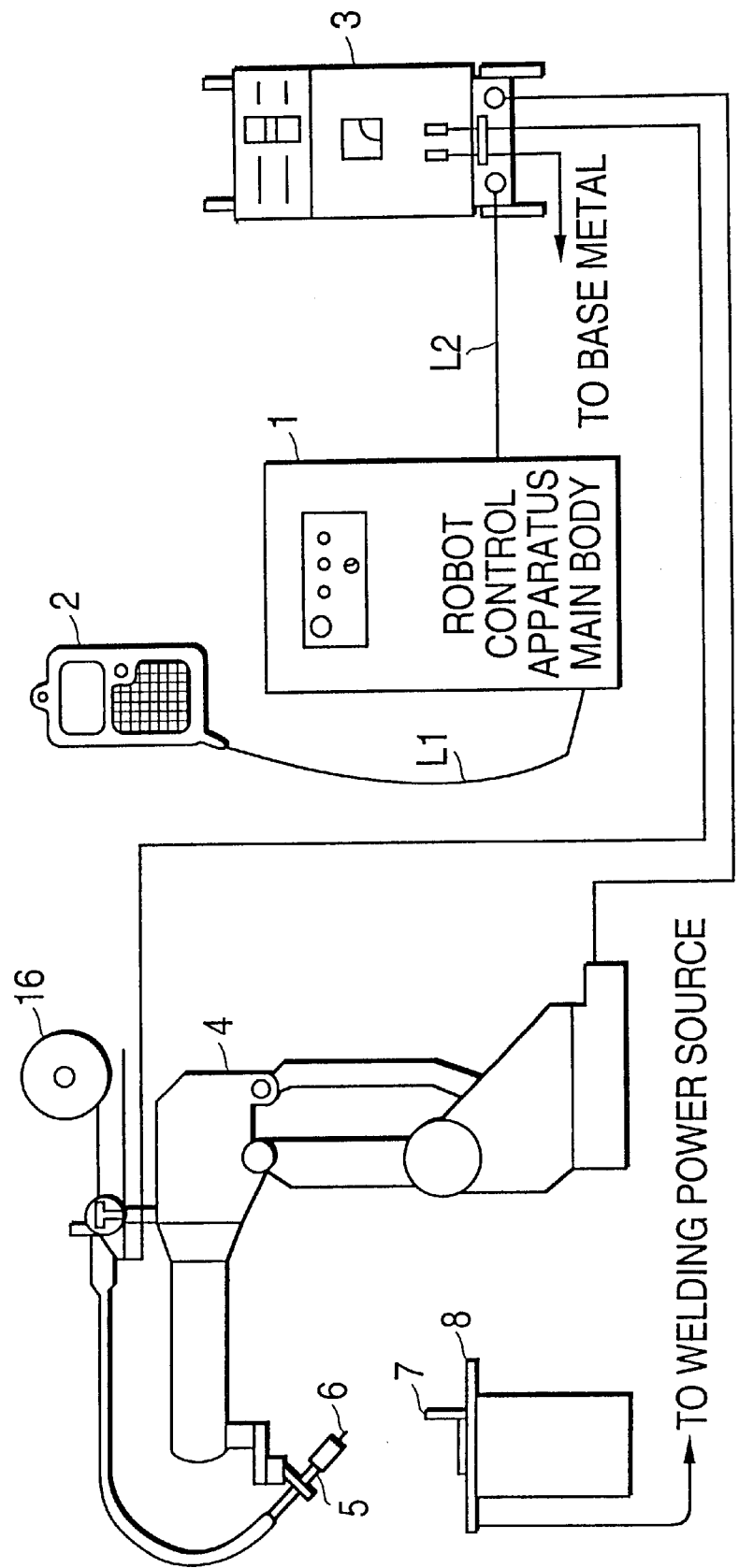
FIG. 1 is a system block diagram of a control apparatus of arc welding robot in an embodiment of the invention.

An embodiment of the invention is described below while referring to FIG. 1 through FIG. 7. In FIG. 1, a robot control apparatus main body 1 is connected to a teaching pendant (hereinafter called TP) 2 which is a man-machine interface for teaching through a communication control line L1, and to a welding power source 3 with a communication control line L2. An operator manipulates the TP2, and while directly observing a wire 6 at the end of a welding torch 5 disposed at a control reference point of an industrial robot main body 4, moves the robot main body 4 delicately, and teaches the robot sequentially in the desired job steps.

Figure 2:
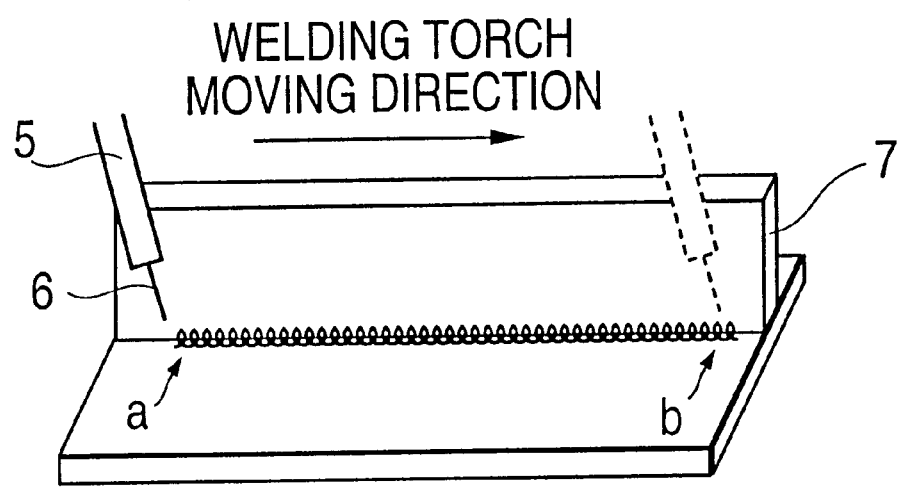
FIG. 2 is a perspective view showing a welding process.

The operator fixes a work 7, which is an object to be welded, to a base metal 8, manipulates the TP 2, moves an effect point, that is, an end of the wire 6 of the welding torch 5 held by a robot arm to a welding start pointing a in FIG. 2. The operator then presses keys to enter teaching position data and the point as the welding start point a, and a regular welding condition command (at least one of welding current and welding voltage excluding crater treatment) and a welding start command (arc-on process sequence) and registers them by pressing a welding start command (arc-on process sequence), and registers them by pressing a welding start point enter key 2a on the TP 2 in FIG. 4. Next, moving the end of the wire 6 of the welding torch 5 to a welding end point b in FIG. 2 with the robot main body 4, the teaching position data and the point as the welding end point b, and a crater welding condition command (at least one of welding current and welding voltage) and a welding end command (arc-offprocess sequence) are entered, and registered by pressing a welding end point enter key 2b n the TP 2.

Figure 3:
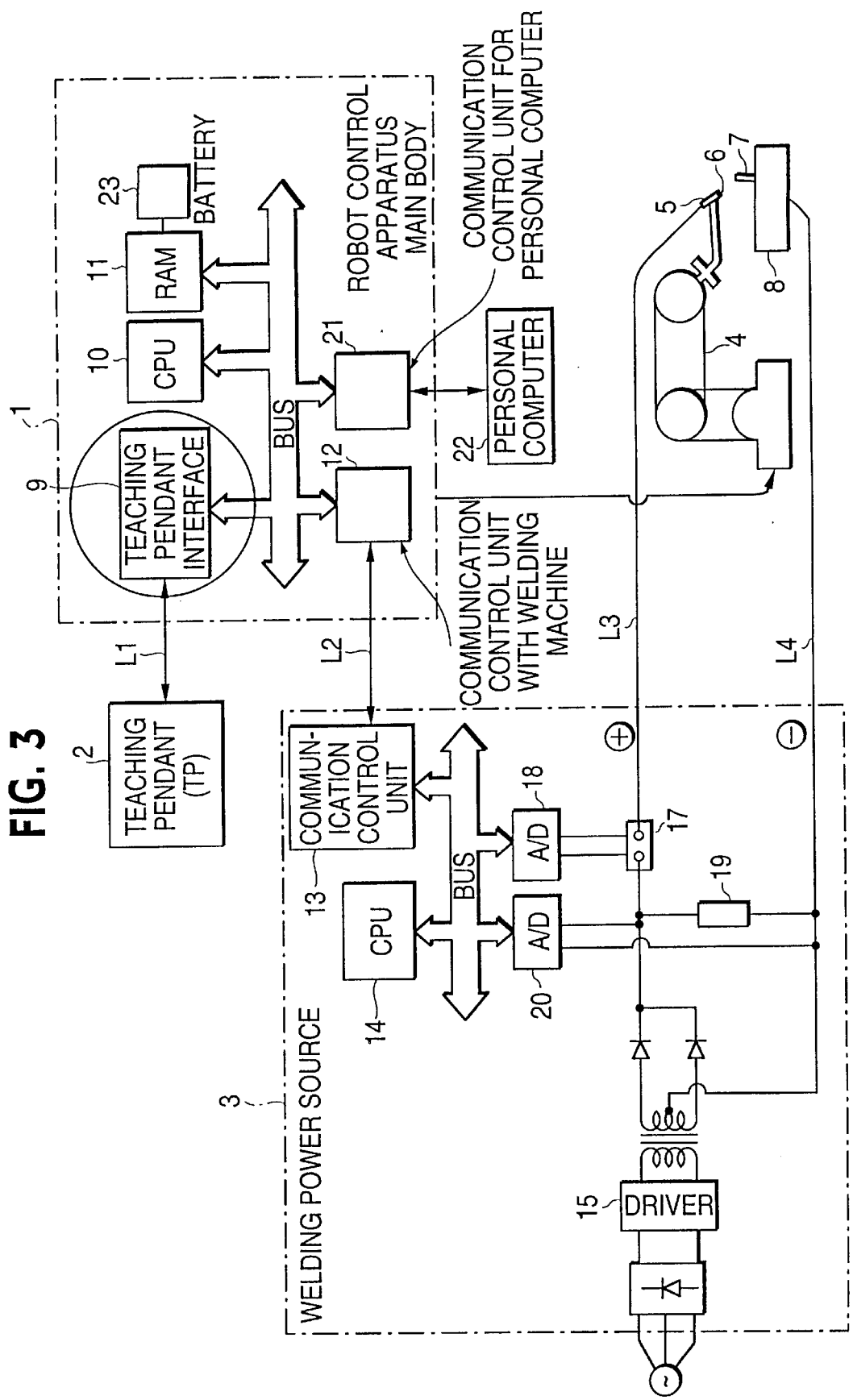
FIG. 3 is a circuit block diagram of the control apparatus of arc welding robot.

The taught program is stored in a RAM 11 which is memory, by a CPU through an interface 9 for the teaching pendant in FIG. 3, and by the registered program of teaching, the automatic welding system in FIG. 1 is put in automatic operation. In the welding operation procedure, when the robot main body 4 moves the end of the wire 6 as the effect point of the welding torch 5 to reach the welding start point a in FIG. 2 which is the specified welding start position of the work 7, the robot control apparatus main body 1 transmits the stored regular welding condition (welding current, welding voltage) to the welding power source 3 by a communication control unit 12 with the welding machine through the communication control line L2 and a communication control unit 13 of the welding power source, and executes the welding start command, and when an arc answer is received from the CPU 14 of the welding power source 3, the end of the wire 6 of the welding torch is moved along a specified welding route of work 7 at a stored welding speed to perform arc welding. Later, when the end of the wire 6 of the welding torch 5 reaches the welding end point b in FIG. 2, the stored crater welding condition (welding current, welding voltage) is transmitted to stop the robot main body 4 temporarily, and the welding end command for crater treatment is executed, and after execution of the crater treatment, a known wire stick check is executed, and it moves to a next teaching point if fusion of the wire 6 on the work 7 is not detected.

Figure 4:
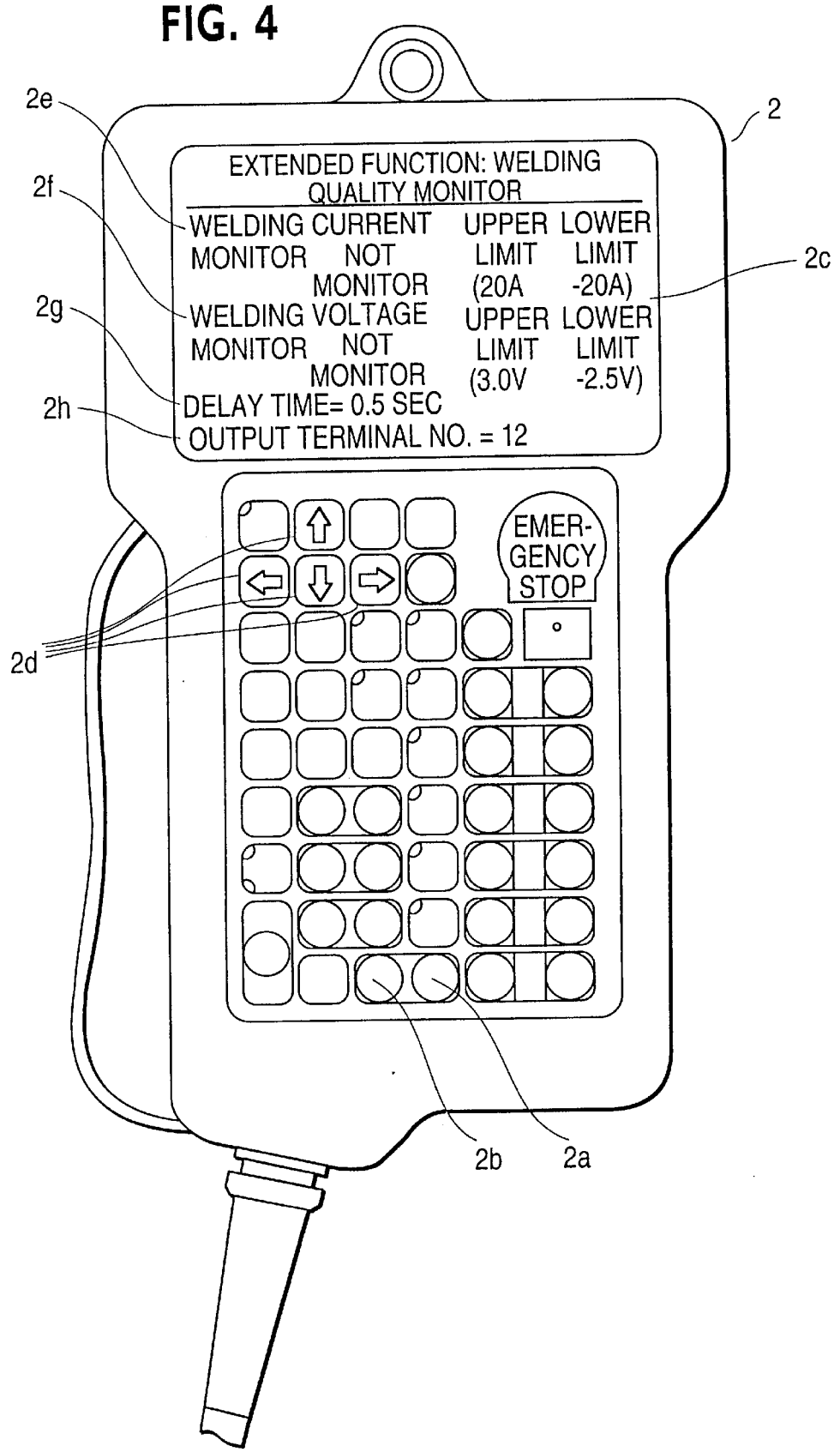
FIG. 4 is a partial plan view of teaching pendant (TP) showing a screen for setting welding condition monitoring.

A liquid crystal display screen on the TP 2 shown in FIG. 4 is explained below. When the operator desires to use an arc welding condition monitoring function, he manipulates a cursor move key 2d of the TP 2 while observing a screen 2c in FIG. 4, and selects at least one of the welding current 2e and welding voltage 2f as a monitoring object of arc welding, and enters a monitoring range by numerical values, that is, in a width of upper and lower allowable ranges corresponding to the welding condition command value or central value. In addition, after receiving the arc answer after the welding start command process, a delay time 2g for delaying the start of the arc welding start command process, a delay time 2g for delaying the start of the arc welding monitoring is set and, in order to notify the operator an occurrence of going out of the arc welding monitoring range, an output terminal number 2h can be set to be used by assigning the robot universal output. Such a set data are stored and held in RAM 11. Consequently, in FIG. 3, when the operation is started by a user, according to the registered program of teaching stored in the RAM 11, the robot main body 4 moves the end of the wire 6 of the welding torch 5 to the specified welding start position (point a in FIG. 2) of the work 7. When the end of the wire 6 of the welding torch 5 reaches the welding start point a, the welding condition command is transmitted to the communication control unit 13 of the welding power source 3 through the communication control line L2 from the communication control unit 12, so that the CPU 14 receives the regular welding condition command (Explanation is omitted for the communication protocol or data format specification.) In the same route, then when the welding start command is transmitted to the welding power source 3 from the robot control apparatus main body 1, the CPU 14 drives a driver 15 through a control circuit (not shown) to generate welding energy, which is transmitted to the wire 6 which is a consumable electrode through a + output L3 of the welding power source, and the wire 6 is fed into the work 7 by a wire feeder 16. The work 7 is connected to a–output L4 of the welding power source 3, and when the wire 6 contacts with the work 7, electric energy of hundreds of amperes and about 20 volts flows from the end of the wire 6 to the work 7, and the wire 6 and part of metal of the work 7 begin to melt, thereby starting the arc welding. When the arc starts, the welding power source 3 transmits the arc answer to the robot control apparatus main body 1 through the communication control line L2 from the communication control unit 13. Receiving this arc answer, the robot control apparatus main body 1 moves the robot main body 4, and moves the preliminarily stored welding speed, along the specified welding route of the end of the wire 6 of the welding torch 5. In the course of the welding, the welding power source 3 obtains, in order to control welding, the actual welding current through a DCCT (Hall element) 17 and an A/D converter 18, and the actual welding voltage through an A/D converter 20 as the voltage at both ends of a bleeder resistance 19. The obtained data are stored in a RAM, not shown in the diagram, averaged in every sampling time, and transmitted to the robot control apparatus main body 1 through the communication control line L2 from the communication control unit 13.

Figures 5, 7:
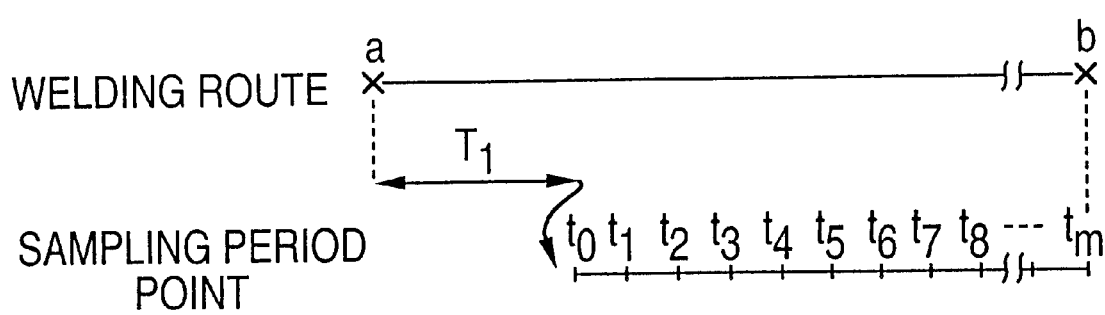
FIG. 5 is an output screen of a welding condition monitoring result.
FIG. 7 is a timing chart showing a monitoring start delay time.

Herein, according to the information set in the liquid crystal display screen 2c of the TP 2 in FIG. 4, the robot control apparatus main body 1, after receiving the arc answer, calculates the difference from the command value (central value) of the taught regular welding condition previously transmitted to the welding power source 3 and an actual welding current and actual welding voltage transmitted from the welding power source 3 in every sampling time, and judges if the difference is within the preset upper and lower allowable range width values. If the difference is within the allowable range width, the welding process continues. If the difference is out of the allowable range width, the universal output terminal selected and assigned above by 2h in the liquid crystal screen 2c is operated, and it is noticed by the operator through hardware not shown in the diagram. At this time, when one welding section is complete, that is, when the end of the wire 6 of the welding torch 5 reaches the welding end point b, the welding condition monitoring screen shown in FIG. 5 is created, and stored and held in the RAM 11, and image information is transmitted to an external personal computer 22 through a personal computer communication control unit 21.

Figure 6:
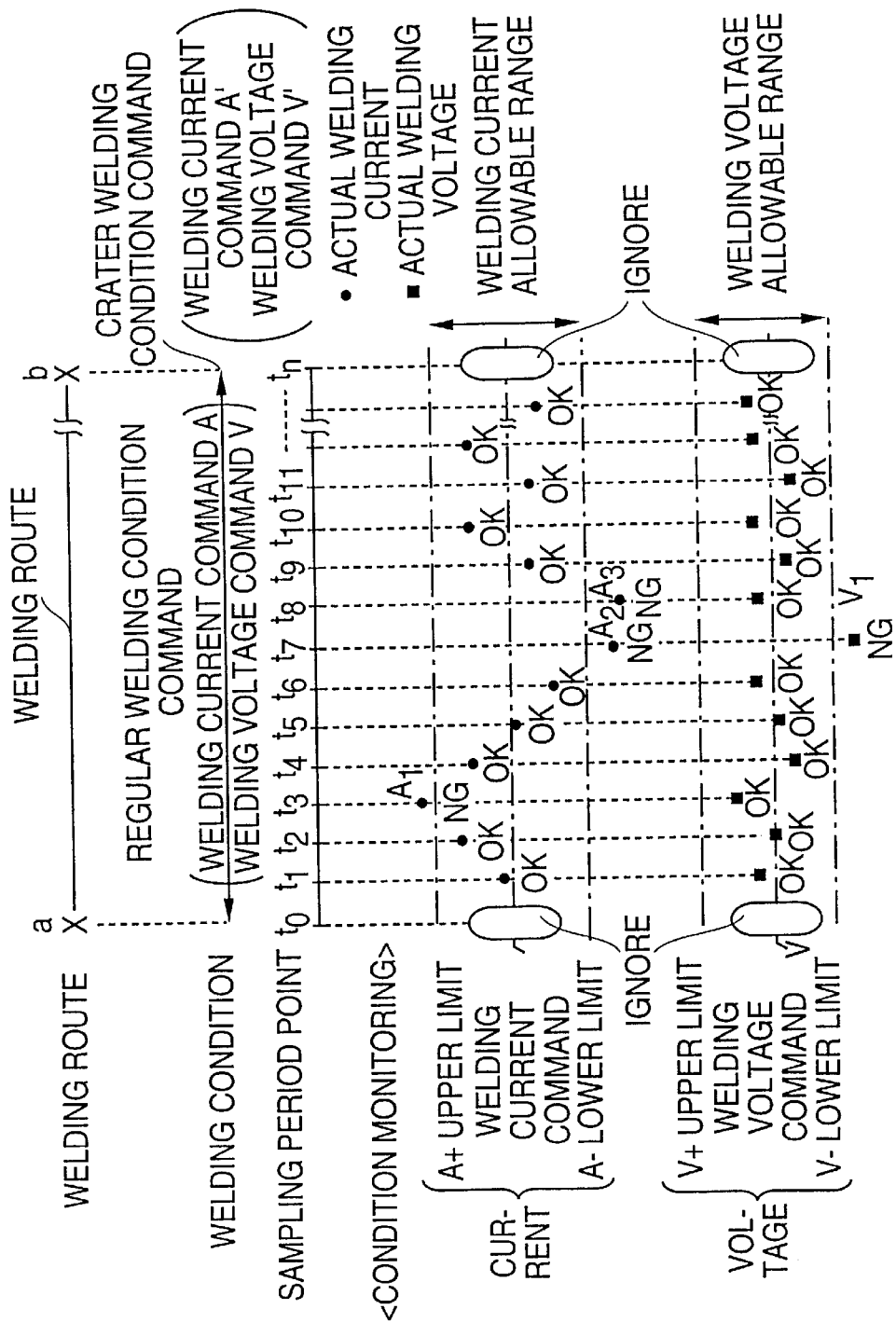
FIG. 6 is a timing chart showing a monitoring procedure of a welding condition in a welding process.

Further, when the end of the wire 6 of the welding torch 5 reaches the welding end point b in FIG. 2, the robot control apparatus main body 1 terminates the arc welding condition monitoring, transmits a stored crater welding condition to the welding power source 3, executes the welding end command, and checks the wire stick (known). It then moves to a next teaching point when no fusion of the wire 6 on the work 7 is found. In FIG. 6, at every sampling period point of to, t1, . . . , tn, the actual welding current and actual welding voltage are transmitted from the welding power source 3 to the robot control apparatus main body 1. The data at sampling period point t0 which is the first data is ignored because it is an unstable portion occurring right after the start of welding, and checking starts from the data of t1 and after. Herein, suppose that the regular welding condition is welding current command value A and welding voltage command value V, the welding condition allowable range can be expressed as follows:

Allowable value lower limit=A–lower allowable range width≦actual welding current≦A +upper allowable range width=allowable value upper limit; and Allowable value lower limit=V–lower allowable range width≦actual welding voltage≦V +upper allowable range width=allowable value upper limit.

In FIG. 6, the obtained actual welding current value is indicated by a solid circle, and the actual welding voltage value by a solid square, and they are indicated to be OK beneath the mark if within the allowable range, and NG if out of allowable range, and, in addition, in the case of the NG, they are expressed as A1, A2 and so forth in the case of the welding current, and V1, V2 and so forth in the case of the welding voltage. In the example in FIG. 6, at the sampling period points t1 and t2, the data is within the allowable range, it is OK, and at the sampling period point t3, since the actual welding current is A+upper allowable range width≦actual welding current, it is expressed as A1. Similarly, in every sampling period, the obtained data is judged to determine if it is within the allowable range, and if out of the range, the data is accumulated until one welding stroke is over. However, the data at sampling period point tn in FIG. 6 or sampling period point tm in FIG. 7 at the crater welding point is ignored, and is not monitored.

In the case of FIG. 6:

Actual welding current≦A–lower allowable range width in A2 and A3;

A+upper allowable range width≦actual welding current in A1 only;

Actual welding voltage≦V–lower allowable range width in V1 only; and

V+upper allowable range width<actual welding voltage in none.

FIG. 5 expresses the above-mentioned information on the screen of TP2 or personal computer 22. FIG. 5 is the screen created when the arc welding condition monitoring function works, and only one screen is created for every welding stroke in which the arc welding condition monitoring function is actuated. In FIG. 5, "12/25" shows that the screen of page 12 is currently displayed while a total of 25 screens have been created. In FIG. 5, "Job 11" shows a job number 11. A job is composed of at least one program. "Prg. 123" is a program number 123, which comprises Job 11, and Step 045 of this program refers to a 45th step. For example, the screen shows that the monitoring action has been actuated in a welding stroke after welding start point a. That is, the step shown in FIG. 5 is the welding start point. In FIG. 5, the actual welding current must be within +20 A (amperes) in the upper allowable range width and –20 A in the lower allowable range width, in terms of the welding current command value. On the other hand, the actual welding voltage must be within +3.0 V (volts) in the upper allowable range width and –2.5 V in the lower allowable range width, in terms of the welding voltage command value. In the screen in FIG. 5, assuming the regular welding condition to be the welding current command value A and the welding voltage command value V, it shows as follows:

A+20 (A)≦actual welding current at one sampling time;

Actual welding current≦A–20 (A) at two sampling times;

V+3.0≦actual welding current at no sampling times; and

Actual welding voltage≦V–2.5 (V) at one sampling time.

Such screens are, in this embodiment, created and stored, for example, as 99 screens. If all of the 99 screens are created and one more screen is added, the screens are in the form of a LIFO and in a link structure, and a latest screen to be added overwrites an oldest screen in the time series, and its screen page is updated from 01/99 to 99/99, and other existing screens are decreased by one each from n in n/99, and the screen page is thus constituted. That is, the smaller the value of n, the older the data. The data is stored in the RAM 11, and is backed up by a battery 23, and is hence stored and held after a main power source is cut off. Instead of the RAM 11, when a magnetic, optical or magneto-optical memory, or holding type memory such as flash memory is used, the battery is not necessary, and including the RAM supported by the battery, all may be said to be nonvolatile memories.

When the end of the wire 6 of the welding torch 5 reaches the welding start point a in FIG. 7, the procedure of welding start is conducted between the robot control apparatus main body 1 and welding power source 3, and at the end of the procedure, the arc answer is transmitted from the robot control apparatus main body 1 from the welding power source 3. The robot control apparatus main body 1, after receiving the arc answer in FIG. 7, delays the arc welding condition monitoring start by the portion of the monitoring start delay time T1 (2g in FIG. 4) according to the information set in the liquid crystal display screen 2c of the TP 2 in FIG. 4, and after the lapse of the delay time T1, it calculates the difference from the welding condition command value taught preliminarily as compared with the actual welding current and actual welding voltage transmitted in every sampling time from the welding power source 3, and judges whether it is within the allowable range width in the CPU 10.

(Embodiment 2)

A second embodiment of the invention is described below while referring to the drawings. This embodiment is similar to embodiment I in arrangement shown in FIG. 1 to FIG. 3, and an explanation of the parts common in arrangement and operation is omitted.

Figure 8:
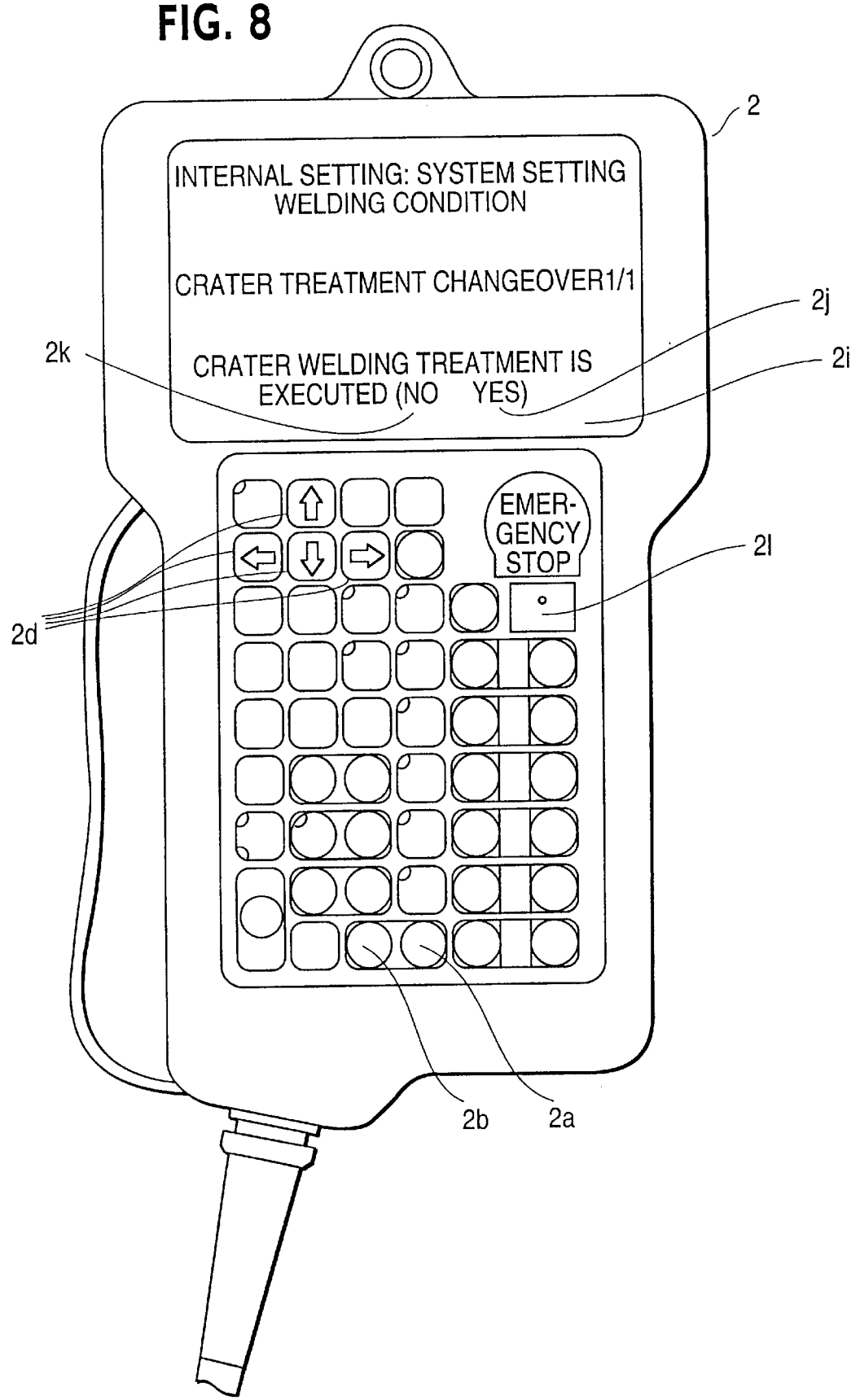
FIG. 8 is a plan view of a teaching pendant (TP) with a liquid crystal display screen in a second embodiment of the invention

Herein, a TP liquid crystal display screen 2i shown in FIG. 8 is described. When executing a first crater treatment in FIG. 9 by the cursor move key 2d of the TP 2, "YES" of 2j is selected, and when executing a second crater treatment in FIG. 10, it can be set by selecting "NO" of 2k and pressing a memory key 21. The selected information is passed through the communication line L1 from the TP 2 in FIG. 3, the CPU 10 recognizes what is selected through the interface 9 from the teaching pendant, and the selected information is stored in the RAM 11, which is also protected by the battery 23 even after all the control power sources are cut off.

Figure 11:
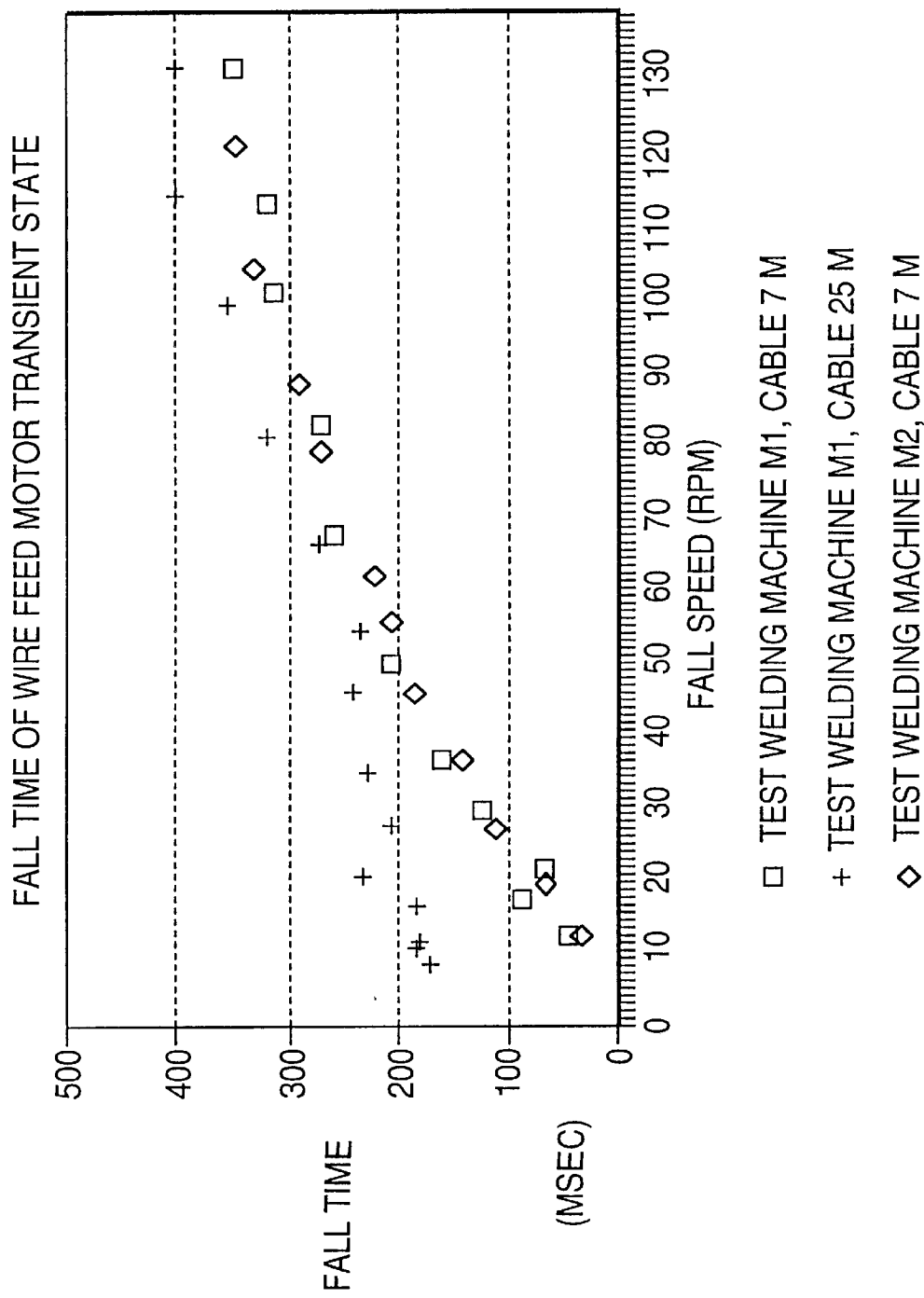
FIG. 11 is a graph of an experiment investigating a fall time of a wire feed motor transient state.
Figure 13:
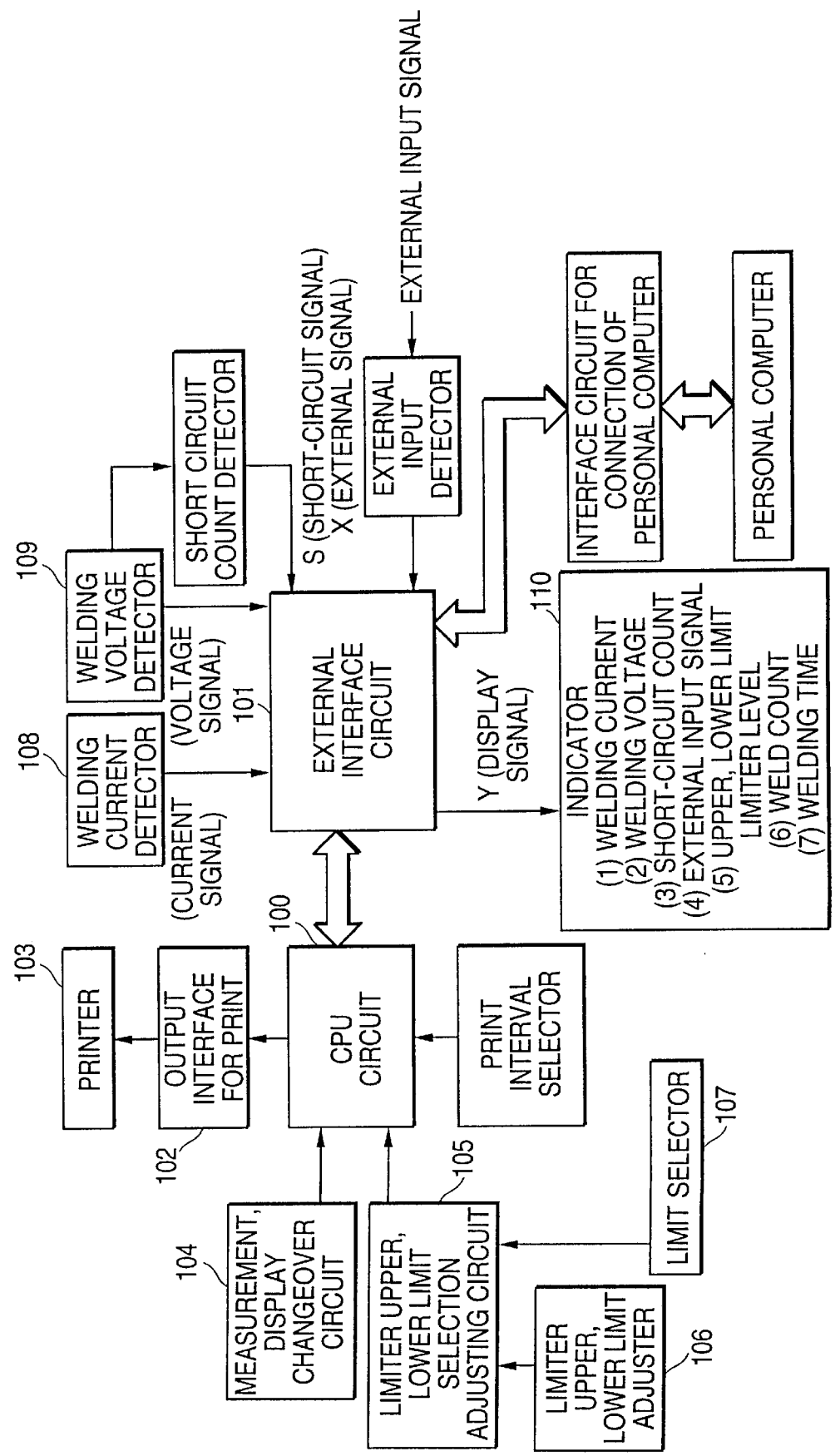
FIG. 13 is a block diagram of a welding condition monitoring apparatus in the prior art.

In FIG. 11, while the wire feeder 16 is rotating at a stable, uniform speed,.when a stop command is sent from the robot control apparatus main body 1 into the welding power source 3, a time required for stopping the wire feeder 16 is obtained by experiment. The wire feeder 16 is driven by a governor circuit provided in the welding power source 3, not shown in the drawing, and this governor circuit is controlled by the CPU 14. In the graph of FIG. 11, marks of blank squares and crosses show data at cable lengths of 7 meters and 25 meters, respectively, from the governor circuit to the wire feeder in a same experimental welding machine M1. Blank lozenge marks refer to data of an actual welding machine M2 in the case of the cable length to the wire feeder of 7 meters in the same wire feeder as indicated by the blank squares or cross marks. From these experimental results, it is known that the response delay of the wire feeder 16 is far larger than 1 millisecond which is a mean required time of communication between the robot and the welding power source.

Rather than effect the response delay by fluctuating the governor circuit, the effect on the response delay caused by changing the cable length of the cable connecting the governor circuit and the wire feeder 16 is greater. When the cable length is longer, the response delay is greater by about one hundred milliseconds than when shorter. As known from FIG. 11, it takes about 350 to 400 milliseconds for the wire feeder 16 to reach 0 rpm from the uniform rotating speed of about 130 rpm. In this embodiment, although not shown, since the rotating speed of the wire feeder is normally proportional to the welding current command, the welding current command is plotted on the axis of abscissas, and the required time until stopping of the wire feeder is plotted on the axis of ordinates, and such a graph (data) is registered in the RAM 11. That is, in this graph, the rotating speed rpm on the axis of abscissas in FIG. 11 is merely replaced by the proportionally corresponding welding current command value A (amperes). In this embodiment, the fundamental data for creating this graph with the personal computer 22 is entered as numerical values in a personal computer input screen in FIG. 12. The leftmost row in FIG. 12 shows the welding current command value, and when a return key of the personal computer 22 is pressed after entry of characteristic values by numeric keys of the personal computer 22 into a row of rotating speeds (rpm) and a row of the actual rotating speed fall times (msec) showing the characteristic of the wire feeder corresponding to each welding current command value, the input data is transmitted to the robot control apparatus main body 1 through the personal computer communication control unit 21 in FIG. 3, and the CPU 10 processes and registers the input data in the RAM 11 of the robot control apparatus main body 1. In the fall time graph of the wire feed motor transient state in FIG. 11, when the welding current command value is changed, for example, from P to Q during crater treatment, the time until the wire feeder is stopped (0 rpm) from the uniform rotating speed corresponding to each welding current command value may be determined, and herein such time values are supposed to be p and q, respectively, Accordingly, when the welding current command value is changed from P to Q in crater treatment, the response delay time of the wire feeder is determined as (p-q) milliseconds. This duration (p-q) is the response delay time "t" of the wire feeder shown in FIG. 9 or FIG. 10.

Referring now to FIG. 3, the operation is described. When the operation is started, according to the teaching program stored in the RAM 11, the robot main body 4 carries the end of the wire 6 of the welding torch 5 to the specified welding start position. When the end of the wire 6 of the welding torch 5 reaches point a in FIG. 2 at the welding start point, a regular welding condition command is transferred to the communication control unit 13 through the communication control line L2 from the communication control unit 12 with the welding power source 3, and the CPU 14 receives the regular welding condition command. (The communication protocol and data format specification are omitted.) Next, in the welding power source 3, the CPU 14 drives the driver 15 with a control circuit (not shown), and welding energy corresponding to the welding current command value is created and transmitted to the welding wire 6 through the+output L3 of the welding power source 3. Corresponding thereto, the CPU 14 drives the wire feeder 16 in FIG. 1 with a governor circuit (not shown), and feeds the wire to the work 7 at the wire feed rate proportional to the welding current command value. The work 7 is connected to the-output L4 of the welding power source 3, and when the wire 6 contacts with the work 7, electric energy of hundreds amperes and about 20 volts flows from the end of the wire 6 into the work 7, thereby starting to melt the wire 6 and part of metal of the work 7. This is the start of arc welding. When the arc starts, the welding power source 3 replies with the arc answer to the robot control apparatus main body 1 through the communication control line L2 from the communication control unit 13. Receiving this arc answer, the robot control apparatus main body 1 moves the robot main body 4, and moves the end of the wire 6 of the torch 5 along the specified welding route of the work 7 at the preliminarily stored welding speed. During the course of welding, the welding power source 3 obtains, in order to control welding, the actual welding current through the DCCT (Hall element) 17 and the A/D converter 18, and the actual welding voltage through the A/D converter 20 as the voltage at both ends of the bleeder resistance 19. Consequently, when the end of the wire 6 of the welding torch 5 reaches point b in FIG. 2 at the welding end point, the robot control apparatus main body 1 executes the arc welding termination in the preset crater welding process procedure.

Figure 9:
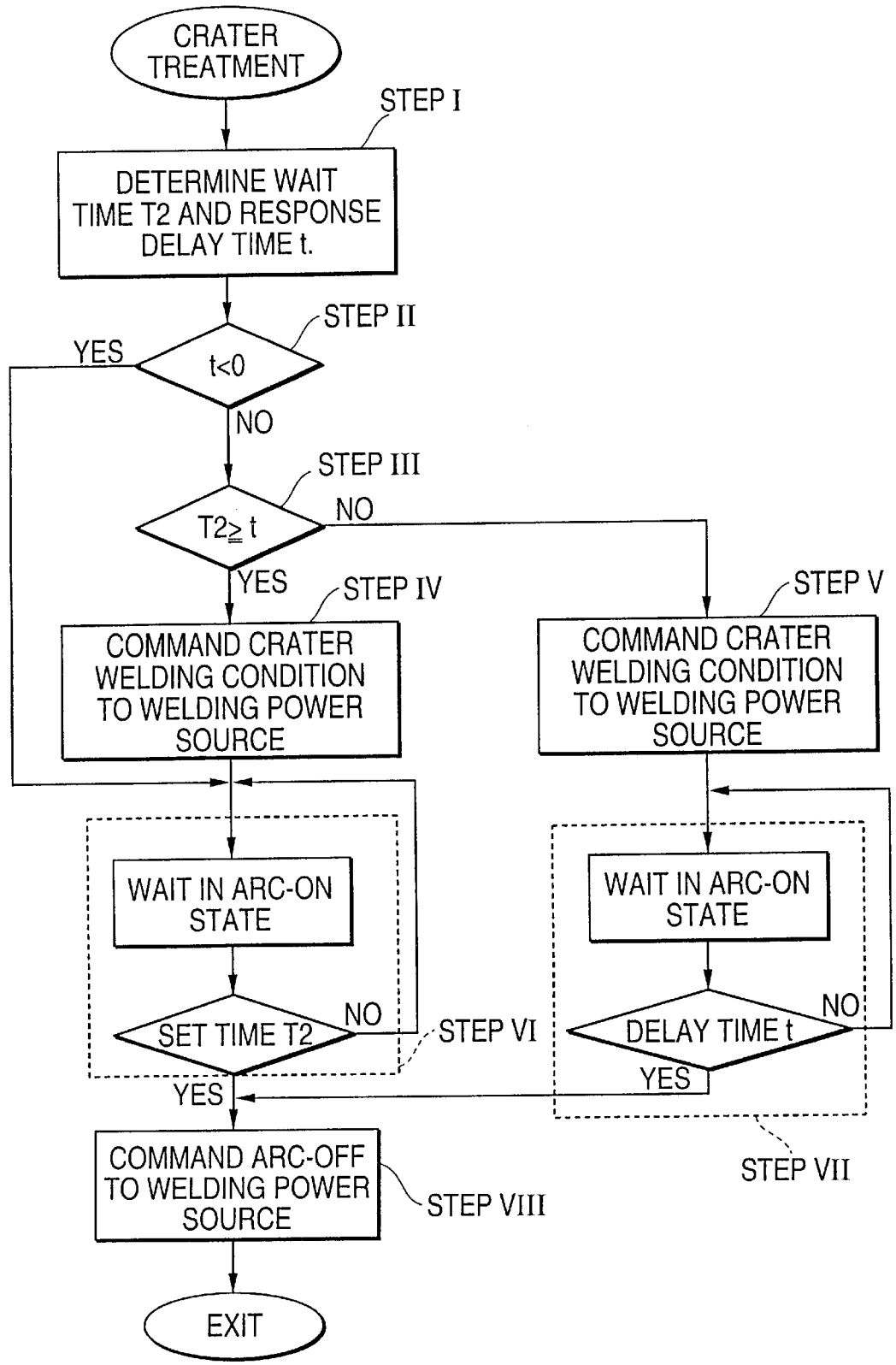
FIG. 9 is a flowchart of a first crater welding treatment in the second embodiment of the invention

First, when preventing sticking while putting emphasis on the welding bead appearance, that is, when YES of 2$j$ is selected and set on the liquid crystal screen display of the TP 2 in FIG. 8, an operation is described while referring to the algorithm in FIG. 9. First, from the teaching playback data taught at step 1, the time difference T2 from the output of the crater welding condition command from the robot control apparatus main body 1 into the welding power source 3 to the actual arc cutoff is determined. Next, similarly, from the graph showing the fall time of the wire feed motor transient state in FIG. 11 stored in the RAM 11, the time required for stopping the wire feeder corresponding to the welding current command value in the regular welding condition command and the welding current command value in the crater welding condition command of the teaching playback data preliminarily taught is determined. Of the two values of time thus obtained, the required time corresponding to the crater welding condition command is subtracted from the required time corresponding to the regular welding condition command, and the result is obtained as the response delay time "t" of the wire feeder.

Herein, although actually impossible at step II, if this "t" has the relationship oft<0, that is, if the crater welding condition command value is a higher value than the regular welding condition command value, the robot is temporarily stopped in a waiting state for the set time "T2" being determined same as the regular welding condition command value commanded at step VI, and the crater treatment is executed to form a beautiful welding bead appearance. Consequently, at step III, if T2>t (and t>0), the response delay time of the wire feeder 16 is maintained, and the crater welding condition command is sent at step IV, and the robot is temporarily stopped in a waiting state for the set time T2 at step VI, thereby executing crater treatment. If the result of judgment at step III is T2<t (and t≧0), the response delay time of the wire feeder is not maintained, and the crater welding condition command is issued at step V, and the robot is temporarily stopped in waiting state for the delay time "t" necessary for a response from the wire feeder at step VII to execute the crater treatment. Finally, welding is terminated by commanding arc cut-off of the welding power source 3 at step VIII.

Figure 10:
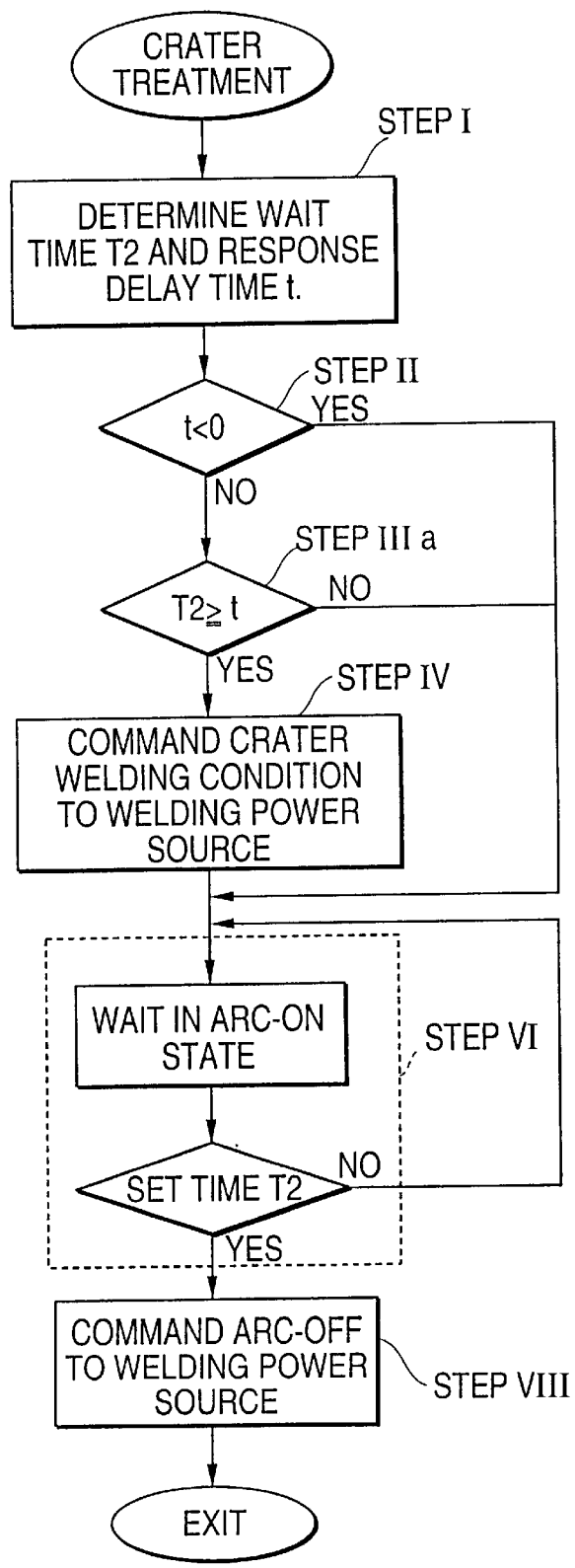
FIG. 10 is a flowchart of a second crater welding in a second embodiment of the invention.

Next, when preventing sticking while putting emphasis on the cycle time, that is, when NO of 2k is selected and set on the liquid crystal screen display of the TP 2 in FIG. 8, the operation is described while referring to the algorithm in FIG. 10. As mentioned above, at step I, the time difference T2 from the output timing of the crater welding condition command to the arc cut-off is determined. In addition to the fall time of the wire feed motor transient state in FIG. 1 1 already stored in the RAM 11, the response delay time "t" of the wire feeder is similarly determined by using each welding current command value. herein, at step II, if this "t" is in the relationship of t<0, the crater welding condition command value is a higher value than the regular welding condition command value, the robot is temporarily stopped in a waiting state for the set time "T2" at the same regular welding condition command value as commanded at step VI, and the crater treatment is executed. If t>0, consequently, at step IIIa, if T2≧t (and t≧0), the response delay time of the wire feeder is maintained, and the crater welding condition command is sent at step IV, and the robot is stopped temporarily in a waiting state for the set time T2 at step VI, thereby executing the crater treatment. On the other hand, if at step IIIa T2<t (and t≧0), the response delay time of the wire feeder is not maintained, and the crater welding condition command is ignored, and at the same commanded regular welding condition command value, at step VI, the robot is temporarily stopped in a waiting state for the set time T2 to execute the crater treatment. Finally, the crater welding treatment is terminated by commanding the arc cut-off to the welding power source 3 at step VIII.

Thus, the CPU 10 acts as a microcomputer and stores a control program so as to change characteristics when the wire feed characteristic is changed due to a change in the model of the wire feeder or the like, and the first or second crater treatment procedure can be executed as required.

In the foregoing embodiments, it is intended to use the TP 2 to teach the robot, but this can also be done through the robot control apparatus main body, or through the personal computer. In such a case, the memory may be disposed at the personal computer side.

According to the first aspect of the invention, since the welding condition monitoring range is specified by the allowable range of numerical values of upper and lower width corresponding to the welding condition command values, not by the actual numerical values, if the welding condition command value is changed by change of teaching and the allowable range values are same, it is not necessary to change the upper and lower limit values.

According to the second aspect of the invention, since the crater treatment in the final welding section is excluded from monitoring, detection error during this operation is prevented.

According to the third aspect of the invention, if the actual arc welding value goes out of the arc welding condition monitoring range, every time this occurs the out-of-range information such as the robot job number, program number, step number, number of times going out of range in the section, and condition monitoring range values is transmitted to the TP or external personal computer for display to the operator.

According to the fourth aspect of the invention, the out-of-range information is stored in the nonvolatile memory in time series, and the memory content is stored and held if the main power source is cut off.

According to the fifth aspect of the invention, since the unstable arc region upon arc start can be excluded from the arc welding condition monitoring object, detection error can be prevented.

Thus, whenever necessary, the operator can obtain the out-of-range information as the data in time series from the TP or external personal computer, and the tendency of the out-of-range phenomenon can be easily understood, so that the welding quality can be maintained and controlled easily and sufficiently.

Moreover, by controlling the welding condition and incorporating the arc welding condition monitoring function in the robot control apparatus main body side (master side) while the welding power source is the slave, and by using the data of the welding power source generated and required for control of the actual welding current and actual welding voltage as the arc welding condition data, an inexpensive and accurate arc welding condition monitoring method is realized.

Also in the arc welding robot control apparatus of the invention, since the crater welding treatment is executed according to the algorithm shown in the sixth or seventh aspect, the wire feed amount is less than the wire penetration allowable amount, so that wire stick does not occur.

In addition, according to the algorithm in the sixth aspect, at the crater welding condition command, since the crater welding treatment is executed while keeping to the minimum limit of the response delay time for the wire feeder, a beautiful welding bead appearance can be obtained in the crater welding treatment area of the object to be welded.

Also according to the algorithm in the seventh aspect, while preventing sticking, since crater welding treatment is executed at the taught set time T2, an exact cycle time according to teaching is assured.

In the eighth aspect of the invention, the robot control apparatus main body comprises the nonvolatile memory means, and the personal computer communication control unit for enabling communication with the personal computer used as the man-machine interface with the CPU for preventing wire stick, if the characteristic (response delay time of wire feeder) is changed due to a wrong cable length or model change of the wire feeder on the personal computer screen, the data (characteristic) change can be prompt, which is a great advantage in the production field.

In the ninth aspect of the invention, either the first algorithm or the second algorithm can be easily selected by the tp as the crater treatment procedure, which is great advantage in the production field.

What is claimed is:

1. A control apparatus for an arc welding robot used for both regular welding and crater treatment, the control apparatus comprising:

an external interface being operable to obtain at least one actual welding condition during operation of the arc welding robot, the at least one actual welding condition comprising at least one of an actual welding current and an actual welding voltage;

an input device being operable to enter a lower allowable range width and an upper allowable range width for a command value for the at least one actual welding condition;

a memory being operable to store the lower allowable range width and the upper allowable range width for the command value;

a central processing unit being operable to judge if the at least one actual welding condition is within at least one allowable range, the at least one allowable range having a lower value equal to the command value minus the lower allowable range width and an upper value equal to the command value plus the upper allowable range width; and an information noticing device being operable to display operation information of the arc welding robot when the at least one actual welding condition is outside the at least one allowable range.

2. A control apparatus claimed in claim 1, wherein said external interface is operable to obtain the at least one actual welding condition only when the arc welding robot is in a regular welding mode and not in a crater treatment mode.

3. A control apparatus claimed in claim 1, wherein said information noticing device is operable to display the operation information when the at least one actual welding condition leaves the at least one allowable range, the operation information comprising at least one of the at least one allowable range, a number of times the at least one actual welding condition leaves the at least one allowable range, a job number, a program number and a step number.

4. A control apparatus claimed in claim 1, wherein said memory comprises a nonvolatile memory operable to store the operation information in time series, and wherein said information noticing device is operable to retrieve the operation information from said nonvolatile memory.

5. A control apparatus claimed in claim 1, wherein said external interface is operable to obtain the at least one actual welding condition only after a monitoring start delay time has expired from start of welding.

6. A method for controlling a robot arm which is utilizing a welding torch, the method comprising:

determining a time until an arc is to be cut off after sending a crater welding condition command to a welding power source in a crater treatment procedure when an effect point of the welding torch held by the robot arm reaches a welding end point;

determining a response delay time of a wire feeder when a welding condition command value is changed from a regular welding condition command value to a crater condition command value;

comparing the time and the response delay time;

if the time is greater than or equal to the response delay time, sending a crater welding condition command to the welding power source, and waiting for the time while temporarily maintaining the welding torch in an arc-on state;

if the time is less than the response delay time, waiting for the response delay time while temporarily maintaining the welding torch in the arc-on state; and commanding arc cut-off of the welding power source either at a point in time after waiting for the time if the time is greater than or equal to the response delay time or at another point in time after waiting for the response delay time if the time is less than the response delay time.

7. A method for controlling a robot arm which is utilizing a welding torch, the method comprising:

determining a time until an arc is cut off after sending a crater welding condition command to a welding condition power source in a crater condition procedure when an effect point of a welding torch held by a robot arm reaches a welding end point;

determining a response delay time of a wire feeder when a welding condition command value is changed from a regular welding condition command value to a crater welding condition command value;

comparing the time and the response delay time;

if the time is greater than or equal to the response delay time, sending the crater condition command to the welding power source;

if the time is less than the response delay maintaining the welding torch in an arc-onmaintaining the welding torch in an arc-on state and at the regular welding condition command value; and commanding arc cut-off of the welding power source either at a point in time after sending the crater condition command if the time is greater than or equal to the response delay time or at another point in time after waiting for the time to pass if the time is less than the response delay time.

8. A control apparatus of an arc welding robot, comprising:

a central processing unit being operable to execute a crater treatment procedure, wherein the crater treatment procedure includes:

determining a time until an arc is to be cut off after sending a crater welding condition command to a welding power source in a crater treatment procedure when an effect point of the welding torch held by a robot arm reaches a welding end point, determining a response delay time of a wire feeder when a welding condition command value is changed from a regular welding condition command value to a crater condition command value, comparing the time and the response delay time, if the time is greater than or equal to the response time, sending a crater welding condition command to the welding power source, and waiting for the time while temporarily maintaining the welding torch in an arc-on state, if the time is less than the response delay time, waiting for the response delay time while temporarily maintaining the welding torch in the arc-on state, and commanding arc cut-off of the welding power source either at a point in time after waiting for the time if the time is greater than or equal to the response delay time or at another point in time after waiting for the response delay time if the time is less than the response delay time; and an output being operable to output information from said central processing unit to the arc welding robot.

9. A control apparatus of an arc welding robot, comprising:

a central processing unit being operable to execute a crater treatment procedure, wherein the crater treatment procedure includes:

determining a time until an arc is cut off after sending a crater welding condition command to a welding condition power source in a crater condition procedure when an effect point of a welding torch held by a robot arm reaches a welding end point, determining a response delay time of a wire feeder when the welding condition command value is changed from a regular welding condition command value to a crater welding condition command value, comparing the time and the response delay time, if the time is greater than or equal to the response delay time, sending the crater condition command to the welding power source, if the time is less than the response delay time, waiting for the time to pass while maintaining the welding torch in an arc-on state and maintaining the welding condition command at the regular welding condition command value, and commanding arc cut-off of the welding power source either at a point in time after sending the crater condition command if the time is greater than or equal to the response delay time or at another point in time after waiting for the time to pass if the time is less than the response delay time; and an output being operable to output information from said central processing unit to the arc welding robot.

10. A control apparatus of an arc welding robot, comprising:

a non-volatile memory being operable to hold characteristic data comprising wire feed characteristic data;

a central processing unit being operable to execute at least one of first and second crater treatment procedures, wherein the first crater treatment procedure includes:

determining a time until an arc is to be cut off after sending a crater welding condition command to a welding power source in a crater treatment procedure when an effect point of a welding torch held by a robot arm reaches a welding end point, determining a response delay time of a wire feeder based on the wire feeder characteristic data when a welding condition command value is changed from a regular welding condition command value to a crater condition command value, comparing the time and the response delay time, if the time is greater than or equal to the response time, sending a crater welding condition command to the welding power source, and waiting for the time while temporarily maintaining the welding torch in an arc-on state, if the time is less than the response delay time, waiting for the response delay time while temporarily maintaining the welding torch in the arc-on state, and commanding arc cut-off of the welding power source either at a point in time after waiting for the time if the time is greater than or equal to the response delay time or at another point in time after waiting for the response delay time if the time is less than the response delay time, and the second crater treatment procedure includes:

determining the time until the arc is cut off after sending the crater welding condition command to the welding condition power source in the crater condition procedure when the effect point of the welding torch held by the robot arm reaches the welding end point, determining the response delay time of the wire feeder when the welding condition command value is changed from the regular welding condition command value to the crater welding condition command value, comparing the time and the response delay time, if the time is greater than or equal to the response delay time, sending the crater condition command to the welding power source, if the time is less than the response delay time, waiting for the time to pass while maintaining the welding torch in the arc-on state and maintaining the welding condition command at the regular welding condition command value, and commanding arc cut-off of the welding power source either at a point in time after sending the crater condition command if the time is greater than or equal to the response delay time or at another point in time after waiting for the time to pass if the time is less than the response delay time;

said central processing unit being further operable to change the wire feed characteristic data based on a model change of the wire feeder;

a personal computer communication control unit linked to said central processing unit, said personal computer communication control unit being operable to communicate with a manmachine interface.

11. A control apparatus claimed in claim 10, wherein said man-machine interface comprises a personal computer.

12. A control apparatus claimed in claim 10, further comprising a teaching pendant interface for connecting a teaching pendant, said teaching pendant interface being operable to receive a command indicating which of the first and second crater treatment procedures said central processing unit should execute.

* * * * *